UNITED STATES PATENT OFFICE.

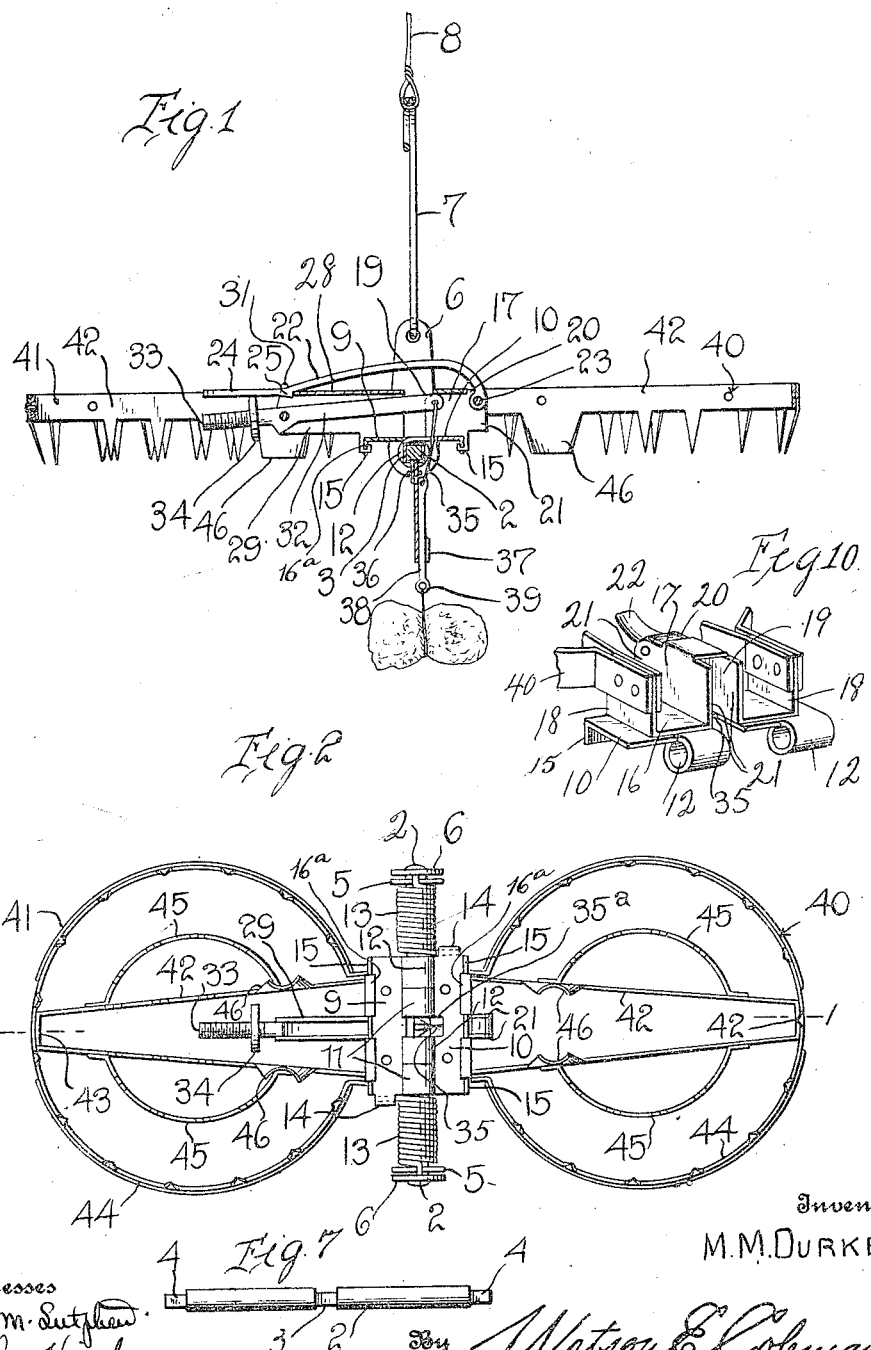

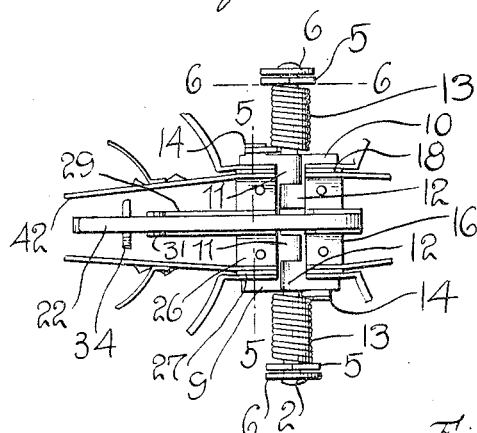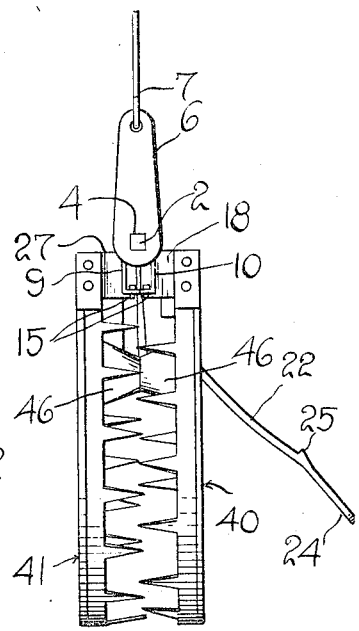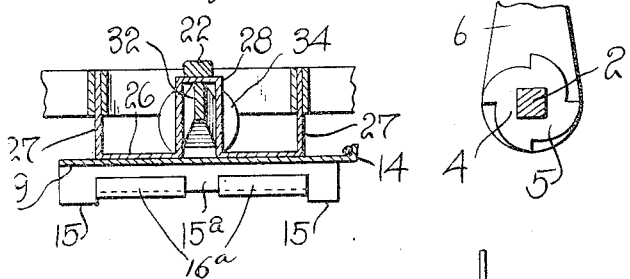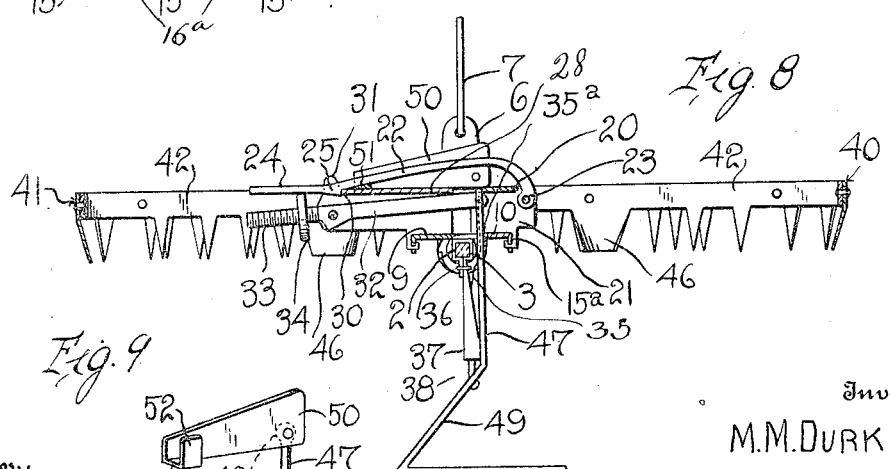

MILAN M. DURKEE, OF LAWTON, OKLAHOMA.

TRAPPING DEVICE.

1,160,269.

Specification of Letters Patent. Patented Nov. 16, 1915.

Application filed February 3, 1915. Serial No. 5,938.

*To all whom it may concern:*

Be it known that I, MILAN M. DURKEE, a citizen of the United States, residing at Lawton, in the county of Comanche and State of Oklahoma, have invented certain new and useful Improvements in Trapping Devices, of which the following is a specification, reference being had to the accompanying drawings.

My invention relates to grappling devices, and particularly to grappling devices in the nature of traps, and adapted to be used for the catching of fish or small animals, but also adapted to be used for seizing and holding anything which may be at the bottom of or floating on water.

The primary object of my invention is the provision of a grappling device of a very simple and effective character for the above purpose particularly adapted for catching fish, which shall be very quick in its action and in which the bait is so supported that the animal nibbling at the bait must actuate the trap.

A further object of the invention is to provide means whereby the sensitiveness of the trap may be regulated, and still another object is to provide means whereby the jaws of the trap or grappling device may be automatically released after being set upon contact with the object with which it is designed to grapple.

Other objects will appear in the course of the following description.

My invention is illustrated in the accompanying drawings, wherein—

Figure 1 is a longitudinal sectional view taken on the line 1—1 of Fig. 2; Fig. 2 is an underside plan view of the grappling device with the jaws open; Fig. 3 is a side elevation with the jaws closed; Fig. 4 is a detail top plan view of a portion of the trap with the jaws open; Fig. 5 is a section on line 5—5 of Fig. 4; Fig. 6 is a fragmentary view showing the pintle in section, and also showing one of the ratchet wheels and bail arm; Fig. 7 is a perspective view of the pintle; Fig. 8 is a longitudinal sectional view on the same line as Fig. 1, but showing my automatic releasing device applied to the trap; Fig. 9 is a perspective view of the upper end of the automatic releasing device; Fig. 10 is a perspective view of one of the hinge leaves and a portion of the corresponding jaw, this figure showing particularly the manner of mounting the latch 22.

Referring to these drawings, it will be seen that the jaws of the trap are mounted upon a common pintle, this pintle being designated 2. The middle of the pintle is squared as at 3, and the extremities of the pintle are also squared as at 4. Mounted upon the squared extremities of the pintle are the ratchet wheels 5, and also mounted upon the squared extremities of the pintle are the arms 6 to which the bail 7 is attached, this bail being adapted to be connected to a cord or other flexible connection 8.

Mounted upon the pintle 2 are the hinge leaves 9 and 10. The hinge leaf 9 is formed preferably of sheet metal and so formed as to provide eyes 11 through which the pintle passes, and the hinge leaf 10 is also so formed as to provide eyes 12 for the same purpose. It will be noticed that these eyes or beads are so arranged that the leaf 9 has one of its eyes 11 on the outside and that the other leaf 10 has one of its eyes on the outside and that the other two eyes 11 and 12 are disposed on each side of the squared portion 3 of the pintle. Thus these eyes alternate in such manner that an eye comes at each end of the hinge at the opposite side from the one at the other end and takes the strain of the actuating springs at that end.

Disposed between the ratchet wheels 5 and the hinge leaves are the springs 13 which are coiled around the pintle and at their outer ends are bent to each engage with its corresponding ratchet wheel, while at the inner end each spring is extended tangentially outward and engaged with a lug 14 formed upon a corresponding hinge leaf. Of course these springs operate in opposite directions and one spring controls the action of one of the trap jaws while the other spring controls the action of the other trap jaw. The hinge leaves are of course opposite each other when the jaws are closed, as shown most clearly in Fig. 3, and each hinge leaf at its ends is formed with downwardly projecting lugs 15 which abut against each other when the jaws are closed and limit the movement of the jaws toward each other under the action of the springs.

Mounted upon one of the hinge leaves is a strip of metal 16. This strip is riveted to the hinge leaf and its forward edge is turned downward and underneath the downwardly extending flange 15ª of the hinge leaf. This strip 16 is upwardly arched at its middle as at 17 and upwardly bent at its ends as at 18 to form ears. The middle arched portion 17 of the strip is cut away at 19 and also at 20, this leaving oppositely disposed ears 21 between which the latch 22 is pivoted as at 23. This provides a rod or finger which is straight for a portion of its length as at 24 and then curved to its pivotal point, the under face of the latch at the base of the portion 24 being formed with a shoulder or notch 25 for engagement with a trigger, as will be later described.

Riveted to the opposite hinge is a strip 26, the ends of which are upwardly turned as at 27 and the middle of which is arched as at 28 and longitudinally extended as at 29. The end of this U-shaped extension is cut away as at 30 and formed with the upwardly extending guide lugs 31. Pivoted within this extension 29 is a trigger 32. One end of this trigger is screw threaded as at 33, and at the base of this screw threaded portion the trigger is pivoted to the walls of the U-shaped extension 29. Mounted upon this screw threaded portion of the trigger is an adjustable nut 34, while the opposite end of the trigger which extends out through the base of the U-shaped portion 29 is perforated for the attachment of a small flexible connection 35 which extends around the squared portion 3 and through an opening 35ª formed in the hinge leaf 10 and so to the bait holder.

For the purpose of supporting bait between the jaws I provide a sleeve or collar which surrounds the squared portion 3 of the pintle 2, this preferably being formed by a strip of metal which is bent around the squared portion, this strip being clamped upon the squared portion by means of a lock 36. The strip then extends outward and is laterally curved so as to provide a semi-tubular guide member and at its extremity is formed with a sleeve 37. Disposed in this sleeve is a rod 38 the extremity of which is formed with an eye 39, the inner end of the rod being attached to the flexible cord or connection 35. Thus it will be seen that any pull upon the rod 38 will pull upon the cord 35 and this in turn will pull upon the trigger 32, which, as will be hereafter described, will release the latch and permit the jaws to close under the action of the spring. The bait is intended to be tied or otherwise attached to the eye 39. It will be seen that this nut constitutes means whereby the leverage exerted by the trigger 32 may be regulated because of the fact that this nut is movable toward or from the pivotal center of the trigger lever. The point where force is applied, that is, where the pull on the bait support is applied to the trigger, and the pivot of the lever, that is, the trigger 32, remains always relatively fixed, and this makes it possible to pass the bait line 35 through a very small opening in the hinge and still have an adjustment that is positive and of such range that the minimum pull can easily be made by a fish three inches long and a hook that would easily hold a ten pound fish. If the nut or member 34 is adjusted from or toward the pivotal center of the trigger 32 the leverage exerted by the trigger 32 upon the latch is changed, and thus by running the nut 34 outward heavy bait can be suspended from the bait holder without danger of tripping the latch. By adjusting the nut inward upon the trigger, that is, nearer to the fulcrum point thereof, the leverage is increased, and thus the trap may be adjusted to catch smaller fish than where the nut is disposed at the outer end of the trigger. I have found in practice that this adjustment of the "pull" upon the trigger is very important, particularly where it is desired that small fish shall not be able to actuate the trap.

The jaws 40 and 41 may be formed in any suitable manner and are attached respectively to the ears 18 and the ears 27, and thus are carried by the hinge plates. Preferably each jaw comprises a strip 42 which is bent at its middle as at 43, the two legs being riveted at their ends to the corresponding ears 18 and 27. Also riveted to these ears is a circular strip 44 which is riveted at its middle to the end of the strip 42. Riveted to the outer faces of the two legs on each strip 42 are the arcuate strips 45. All these strips 42, 44 and 45 are formed with downwardly projecting prongs or teeth, and preferably each of the strips 42 is also formed adjacent the point of connection of the strips 45 with the inwardly extending lugs 46 which are so arranged as to abut against each other when the jaws are closed and to form bumpers or stops limiting the inward movement of the jaws toward each other. Inasmuch as these bumpers or stops 46 are formed on the strip of sheet metal 42, these lugs, stops, or bumpers are concavely curved reversely to each other, as shown clearly in Fig. 2.

When this device is to be used as a trap, that is, used for the purpose of seizing small animals, and particularly fish, the jaws of the trap are turned into horizontal position, as illustrated in Fig. 1, and the latch 22 is turned back over the face of the U-shaped housing or extension 29 and disposed between the guide lugs 31 with the notch 25 engaged by the edge of the extension 28. If now the bait be pulled, the strain on the flexible connection 35 will pull downward on the outer end of the trigger 32 causing the nut carrying end to move upward slightly, which will disengage the latch from its engagement with the extension 28, whereupon the springs will cause the jaws to snap and the animal will be impaled upon the teeth, prongs or spikes carried by the jaws. It will be noted in this connection that the spikes on one jaw are in staggered relation to the spikes on the other jaw, thus affording a secure grip upon the animal. It is also to be noted that the object of the parts 35, 37 and 38 is to support the bait in such position that the animal cannot pull the bait out under the end of the pintle and thus spring the hook or grapple by a side pull and escape. This bait support or controller causes the holding device to tilt on the main line which is attached to the bail, thus keeping the bait always well inside the reach of the jaws and preventing any lateral movement of the bait out of the area described by the jaws.

When my device is intended to be used for the purpose of grappling an object in the water, means must be provided for automatically tripping the latch upon contact with the object. To this end I provide the auxiliary tripping device shown in Fig. 8. This comprises a rod or wire 47 which is formed with an eye 48 at one end and at the other end is angularly bent as at 49 and then bent at right angles to the body of the wire 47. Pivoted to the eye 48 is a plate 50, the extremity of which is formed with a laterally extending finger 51 having at its end a lug 52. When it is desired to use this automatic releasing device the wire is passed downward through the opening 35ª in the hinge plate through which the flexible connection 35 passes, and with the jaws horizontal and the latch in engagement with the detent 34 the plate 50 is disposed parallel to and against one side of the latch 22 with the finger 51 extending under the latch, that is, between the latch and the extension 28. Now if the grappling device be lowered and so moved as to bring the lower end of the wire 47 in contact with the object, this tripping device will be raised by contact with the object and this will pry up the latch 22 from its engagement with the detent, causing the snapping or tripping of the jaws. Of course it is to be understood that when in use in this manner the line 8 supporting the grappling device will be attached to a pole or rod, the line passing out through the middle of the rod. Thus by rotating the pole in the hands the grappling device may be caused to rotate horizontally either in the air or the water until the jaws stand across the object to be seized. By the provision of the ratchet members 4 on the ends of the pintle I provide means whereby the springs may be initially tensioned to any desired extent. In assembling the structure the hinge leaves are set together properly and then the pintle is run through the hinge leaves and one spring is slipped on. The corresponding ratchet wheel is then placed upon the pintle. The short hook on the outer end of the spring is then engaged in a notch of the ratchet wheel. The pintle is then turned until the inner end of the spring touches and lies upon the projecting upturned end of the hinge leaf on that side. The hinge leaves being closed together the other spring is then slipped on, after which the corresponding ratchet wheel is placed upon the pintle and the hook of the spring is put on in a notch of the ratchet wheel so that the inner end of the spring last put on will not bear upon the projecting end of the hinge leaf but stand out from it a quarter of a turn. This end of the spring is then grasped by pliers and pulled backward around the pintle three-quarters of a turn until it passes the upturned projecting end 14 of the hinge leaf. The spring is then engaged with the hinge leaf and snapped into place. Since the two springs pull against each other the three-quarter turn given to the second spring is divided between them and gives each spring such a tension as would result from three-eights of a turn on each one. Now it is plain that if before putting the second spring in place the outer hook of the spring had been engaged in a different notch of the ratchet wheel, both of the springs would have a different tension. If it is desired to change the tension of the springs after the parts are fully assembled, it is only necessary to grip the hooked end of one or the other of the springs in pliers and carry it around the corresponding ratchet wheel so as to increase the tension of the spring or decrease it and then engage it with one of the teeth of the ratchet wheel.

While I have described the preferable details of my construction I wish it to be understood that many modifications might be made therein without departing from the spirit of my invention, but preferably, however, the device is made as heretofore described because as so made the device is simple, may be cheaply manufactured, and is relatively light and portable.

While I have illustrated straight teeth, I wish it understood that the teeth might be slightly curved or bent so as to converge inward toward the eye in the top of the bail. Thus there will be a tendency to draw the animal or article seized into the device and the hold will be more secure than if the teeth were perfectly straight. In the drawings certain of the teeth are shown as curved, and it will be understood that some or all of the teeth may be curved if desired.

Having described my invention, what I claim is:

1. An automatic grappling device comprising a pintle, oppositely disposed jaws hinged to the pintle, a pair of springs on the pintle engaging each with one of the jaws, a latch operatively mounted on one jaw, a trigger operatively mounted on the other jaw and operating the latch, means for adjusting the pull of the trigger, and a bait holder operatively connected to the trigger.

2. A grappling device comprising a pintle, oppositely disposed jaws hinged to the pintle, a pair of springs on the pintle and engaging each with a jaw, a latch operatively mounted on one jaw, a trigger operatively mounted on the other jaw, an adjustable member mounted upon the trigger and engaging with the latch, and a bait holder operatively connected to the trigger.

3. A grappling device comprising a pintle, oppositely disposed jaws hingedly mounted on the pintle, a pair of springs on the pintle engaging each with a jaw and urging the jaws to a closed position, a latch operatively mounted on one jaw and adapted when the jaws are opened to engage the opposite jaw and hold the jaw in position, a trigger operatively mounted on the other jaw, said trigger being screw-threaded at its end, an internally threaded member mounted upon the threaded portion of the trigger and being movable toward or from the pivotal center of the trigger, and a bait holder operatively connected to the opposite end of the trigger.

4. In a trap of the character described, a pintle, a pair of hinge leaves mounted upon said pintle, springs each connected with one of said hinge leaves and urging the hinge leaves in parallel relation, a jaw mounted upon each hinge leaf, a latch pivotally mounted upon one of said hinge leaves and movable over upon and into engagement with the opposite jaw when the jaws are in horizontal position, said latch having a notch to engage said opposite jaw, a trigger pivotally mounted upon said last named jaw, a bait holder depending from said pintle, and an operative connection from said bait holder to said pivoted trigger whereby to trip the trigger and disengage the detent from the latch.

5. In a trap of the character described, oppositely disposed spring actuated jaws including strips of sheet metal, each of said strips being formed on its edge with prongs, one of said strips on one jaw being bent to provide transversely curved stops, the opposite jaw being formed with corresponding stops but reversely curved to the stops on the first-named jaw.

6. In a grappling device of the character described, a pintle, hinge leaves mounted upon the pintle and carrying jaws, oppositely coiled springs mounted upon said pintle on each side of the hinge leaves, each spring being connected at its inner end to one of said hinge leaves, and ratchet wheels mounted upon the ends of the pintle with which the ends of the springs respectively engage.

7. In a grappling device, a pair of spring actuated jaws, a latch adapted to hold the jaws open, a pivoted trigger, a bait support operatively connected thereto, and means carried by the trigger and engageable with the latch to trip it, said means being adjustable toward or from the pivotal axis of the trigger.

8. In a grappling device, a pair of spring actuated jaws, a pivoted latch adapted to hold the jaws open, a pivoted trigger, a bait support operatively connected thereto, and means carried by the trigger and engageable with the latch to trip it, said means being adjustable toward or from the pivotal axis of the latch.

9. In a grappling device, a pair of spring actuated jaws, a latch adapted to hold the jaws open, a pivoted trigger, bait supporting means connected to the trigger, and adjustable means controlling the power exerted by the trigger upon the latch to disengage the latch.

10. In a grappling device, a pair of spring actuated jaws, a latch adapted to hold the jaws open, a pivoted trigger, a bait supporting means operatively connected to the trigger, and means mounted upon the trigger engaging the latch and adjustable to change the leverage of the trigger.

11. In a grappling device, a pair of spring actuated jaws, a latch adapted to hold the jaws open, a trigger adapted to release the latch, a bait supporting means operatively connected to the trigger, and means for changing the leverage exerted by the trigger upon the latch.

12. In a grappling device of the character described, the combination with a pair of spring actuated jaws, a latch mounted upon one jaw and operatively engaging the other jaw to hold the jaws in open position, and means for normally releasing the latch, of auxiliary means for releasing the latch comprising a member removably disposed upon the upper faces of the jaws when the jaws are opened and engaging between the latch and the adjacent jaw, and an actuating rod extending downward from said member and between the jaws and having a terminal end disposed below the jaws when the latter are in open position.

13. In a grappling device of the character described, a pair of spring actuated jaws, a common pintle therefor, a latch, a trigger, a guide depending from and mounted upon the pintle, a member reciprocatingly mounted upon the guide and flexibly connected to the trigger, and flexible means for supporting bait upon said member.

14. In a grappling device of the character described the combination with a pair of spring actuated jaws, a latch adapted to hold the jaws in open position, and means for normally releasing the latch, of auxiliary means for releasing the latch detachably supported in a position depending below said jaws when the latter are in open position.

In testimony whereof I hereunto affix my signature in the presence of two witnesses.

MILAN M. DURKEE.

Witnesses:
D. M. ALLEN,
JACOB GOODING.